(12) United States Patent
Odman

(10) Patent No.: US 7,634,275 B2
(45) Date of Patent: Dec. 15, 2009

(54) METHOD OF ACCOMMODATING PERIODIC INTERFERING SIGNALS IN A WIRELESS NETWORK

(75) Inventor: Knut T. Odman, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 920 days.

(21) Appl. No.: 10/609,667

(22) Filed: Jul. 1, 2003

(65) Prior Publication Data

US 2004/0058686 A1 Mar. 25, 2004

Related U.S. Application Data

(60) Provisional application No. 60/393,185, filed on Jul. 3, 2002, provisional application No. 60/393,186, filed on Jul. 3, 2002.

(51) Int. Cl.
H04Q 7/20 (2006.01)
(52) U.S. Cl. .................. 455/450; 455/452.2; 455/63.1; 370/252; 370/332; 370/445; 370/337; 370/338
(58) Field of Classification Search .................. 370/446, 370/445, 450, 452, 350, 338, 328, 208; 455/62, 455/450, 452.2, 452, 515; 375/329, 229
See application file for complete search history.

(56) References Cited

U.S. PATENT DOCUMENTS

| 6,016,430 | A * | 1/2000 | Shinomiya | 455/515 |
|---|---|---|---|---|
| 6,434,132 | B1 * | 8/2002 | Ishii et al. | 370/338 |
| 6,587,453 | B1 * | 7/2003 | Romans et al. | 370/347 |
| 6,738,394 | B1 * | 5/2004 | Kreuzgruber et al. | 370/514 |
| 7,127,254 | B2 * | 10/2006 | Shvodian et al. | 455/450 |
| 7,406,051 | B2 * | 7/2008 | Khun-Jush et al. | 370/252 |
| 2002/0060995 | A1 * | 5/2002 | Cervello et al. | 370/332 |
| 2002/0061031 | A1 * | 5/2002 | Sugar et al. | 370/466 |
| 2002/0105903 | A1 * | 8/2002 | Takahashi et al. | 370/208 |
| 2002/0136183 | A1 * | 9/2002 | Chen et al. | 370/338 |
| 2002/0136331 | A1 * | 9/2002 | Wilhelmsson et al. | 375/329 |
| 2003/0040319 | A1 * | 2/2003 | Hansen et al. | 455/452 |
| 2003/0161279 | A1 * | 8/2003 | Sherman | 370/328 |
| 2003/0174690 | A1 * | 9/2003 | Benveniste | 370/350 |

* cited by examiner

Primary Examiner—Charles N Appiah
Assistant Examiner—Michael T Vu

(57) ABSTRACT

A method is provided for accommodating periodic interfering signals in a wireless network. In this method, a network scans a transmission medium to locate any interfering signals. If it finds interfering signals, the scan determines their period, and the network alters the period of its superframes such that: either the period of the superframes is equal to the period of the interfering signals; the period of the superframes is an integer multiple of the period of the interfering signals; or the period of the interfering signals is an integer multiple of the period of the superframes. The network then alters the position of the superframes relative to the position of the interfering signals to arrange things such that no portion of the interfering signal interferes with a superframe beacon, such that that a maximum amount of contiguous channel time is provided in each superframe, or both.

21 Claims, 9 Drawing Sheets

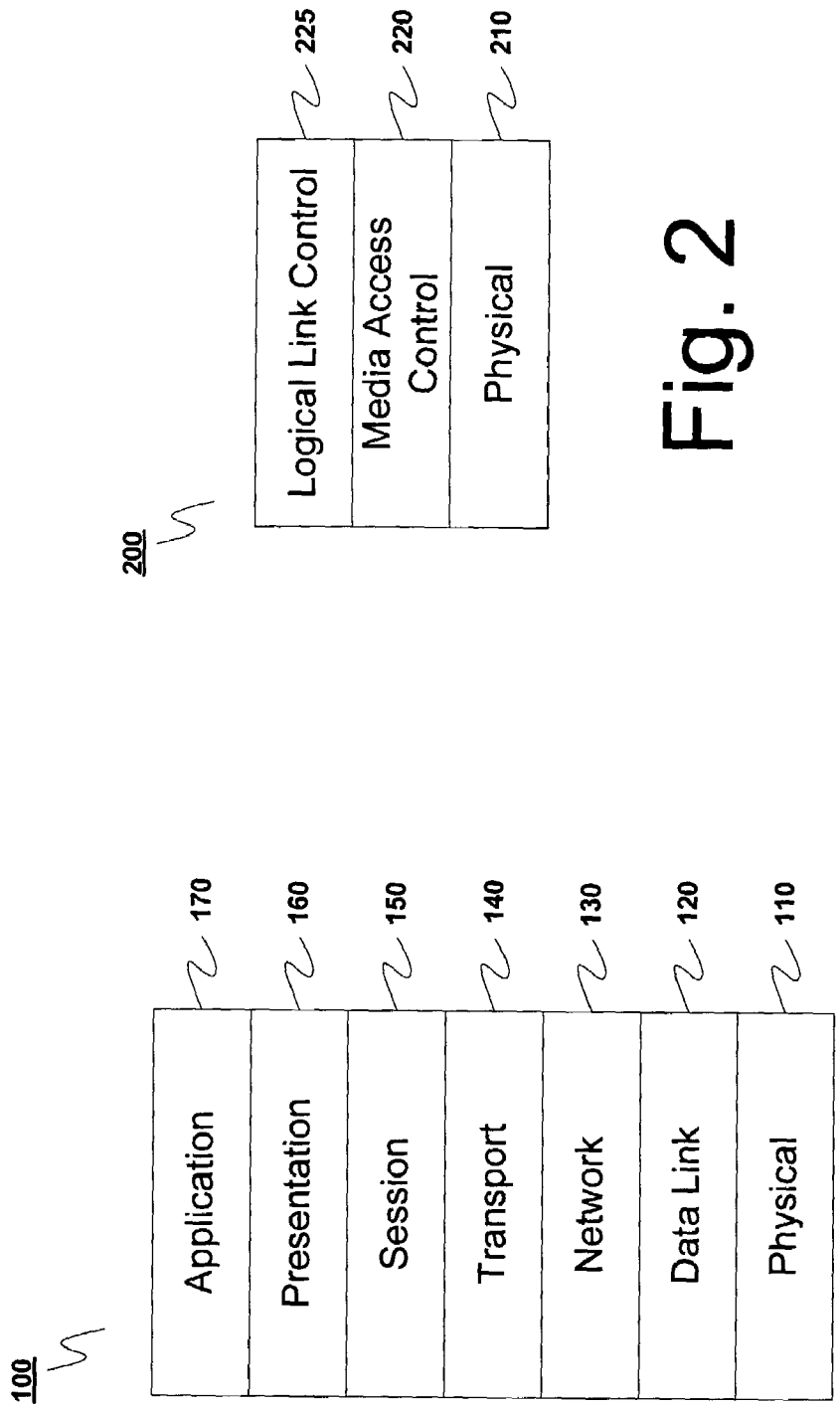

METHOD OF ACCOMMODATING PERIODIC INTERFERING SIGNALS IN A WIRELESS NETWORK

CROSS-REFERENCE TO RELATED PATENT DOCUMENTS

This application relies for priority on U.S. provisional application Ser. No. 60/393,185, by Knut T. Odman, filed Jul. 3, 2002, entitled "Method of Synchronizing Change of Network Critical Parameters," and U.S. provisional application Ser. No. 60/393,186, by Knut T. Odman, filed Jul. 3, 2002, entitled "Method of Synchronizing Changes of Superframe Duration and Beacon Position," the contents of both of which are hereby incorporated by reference in their entirety.

BACKGROUND OF THE INVENTION

The present invention relates to wireless personal area networks and wireless local area networks. More particularly, the present invention relates to a method for accommodating periodic interfering signals in a wireless network.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 70.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 70 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

SUMMARY OF THE INVENTION

Consistent with the title of this section, only a brief description of selected features of the present invention is now presented. A more complete description of the present invention is the subject of this entire document.

An object of the present invention is to manage a wireless network such that it can accommodate a periodic interfering signal in a simple manner, allowing for easy data transfer in a manner that avoids the interfering signal.

Another object of the present invention is to implement any required change in system parameters in a manner that allows some devices in a network to enter a sleep mode without missing key system change instructions.

These and other objects are accomplished by way of a method of accommodating periodic interfering signals in a wireless network. This method comprises: scanning in a transmission medium for the interfering signals; determining a period of the interfering signals; and altering a superframe period in the wireless network such that the superframe period is equal to the period of the interfering signals.

The method may comprise altering a superframe position relative to an interfering signal position. The step of altering a superframe position relative to an interfering signal position may be performed such that no portion of the interfering signal interferes with any superframe beacon. The step of altering a superframe position relative to an interfering signal position may also be performed such that a maximum amount of contiguous channel time that is not interfered with by the interfering signals is provided in each superframe The method may further comprise assigning to a network coordinator all channel time in each superframe that is interfered with by the interfering signals.

The periodic interfering signals may be radar signals. The wireless network may be an ultrawide bandwidth network.

An alternate method is also provided of accommodating periodic interfering signals in a wireless network. This method comprises: scanning in a transmission medium for the interfering signals; determining a period of the interfering signals; and altering a superframe period in the wireless network such that the superframe period is equal to n times the period of the interfering signals, where n is an integer greater than 0.

The method may further comprise: altering a superframe position relative to an interfering signal position. The step of altering a superframe position relative to an interfering signal position may be performed such that no portion of the interfering signal interferes with any superframe beacon. The step of altering a superframe position relative to an interfering signal position may also be performed such that a maximum amount of contiguous channel time that is not interfered with by the interfering signals is provided in each superframe The method may further comprise assigning to a network coordinator all channel time in each superframe that is interfered with by the interfering signals.

The periodic interfering signals may be radar signals. The wireless network may be an ultrawide bandwidth network.

Another alternate method is also provided of accommodating periodic interfering signals in a wireless network, comprising: scanning in a transmission medium for the interfering signals; determining a period of the interfering signals; and altering a superframe period in the wireless network such that the superframe period is equal to 1/n times the period of the interfering signals, where n is an integer greater than 0.

The method may further comprise: altering a superframe position relative to an interfering signal position. The step of altering a superframe position relative to an interfering signal position may be performed such that no portion of the interfering signal interferes with any superframe beacon. The step of altering a superframe position relative to an interfering signal position may be performed such that a maximum amount of contiguous channel time that is not interfered with by the interfering signals is provided in each superframe The method may further comprise assigning to a network coordinator all channel time in each superframe that is interfered with by the interfering signals.

The periodic interfering signals may be radar signals. The wireless network may be an ultrawide bandwidth network.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a diagram showing the hierarchy of the seven-layered OSI standard;

FIG. 2 is a diagram showing the IEEE 802 standard;

DETAILED DESCRIPTION OF THE PREFERRED EMBODIMENTS

Figure 3:
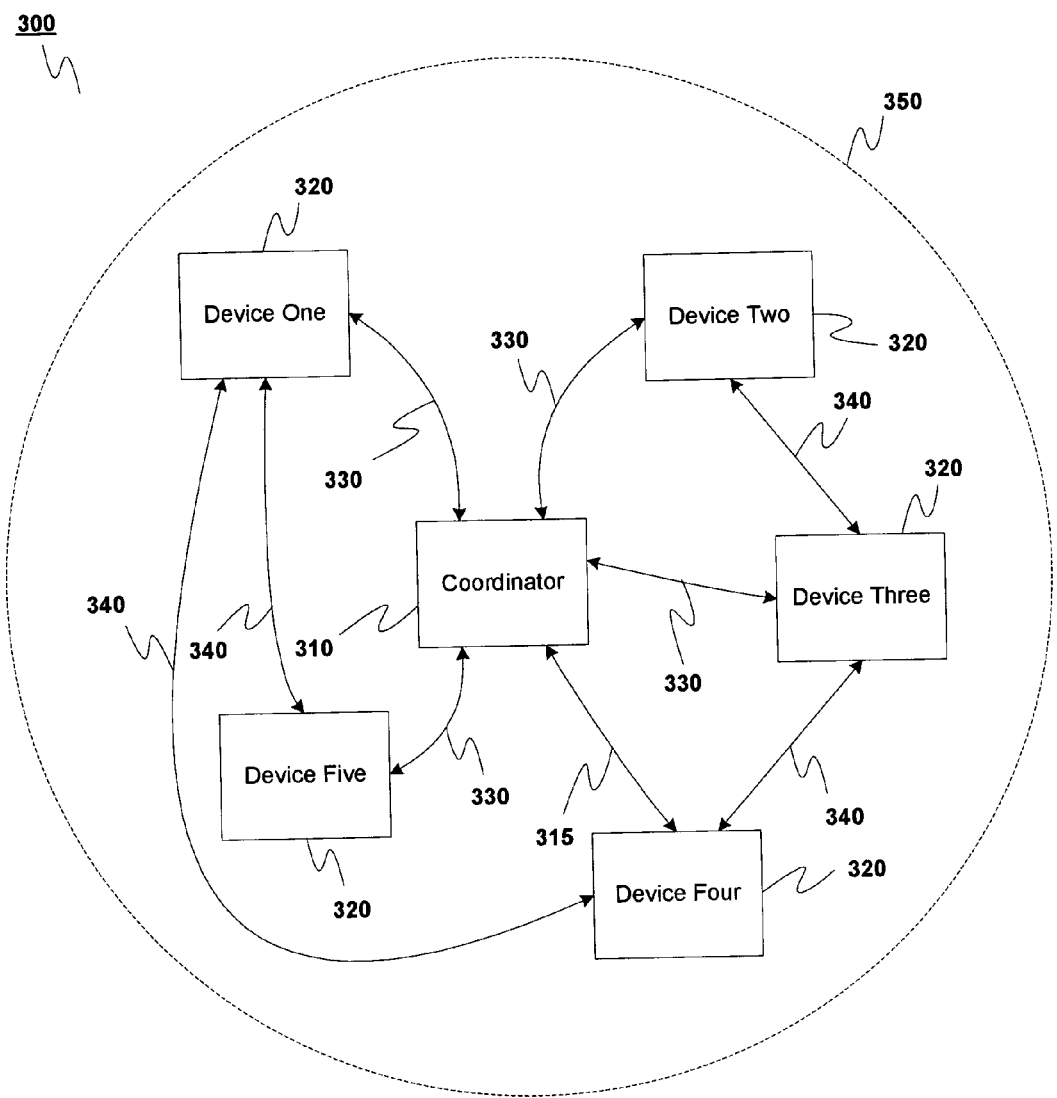
FIG. 3 is a block diagram of a wireless network according to a preferred embodiment of the present invention.
Figure 4:
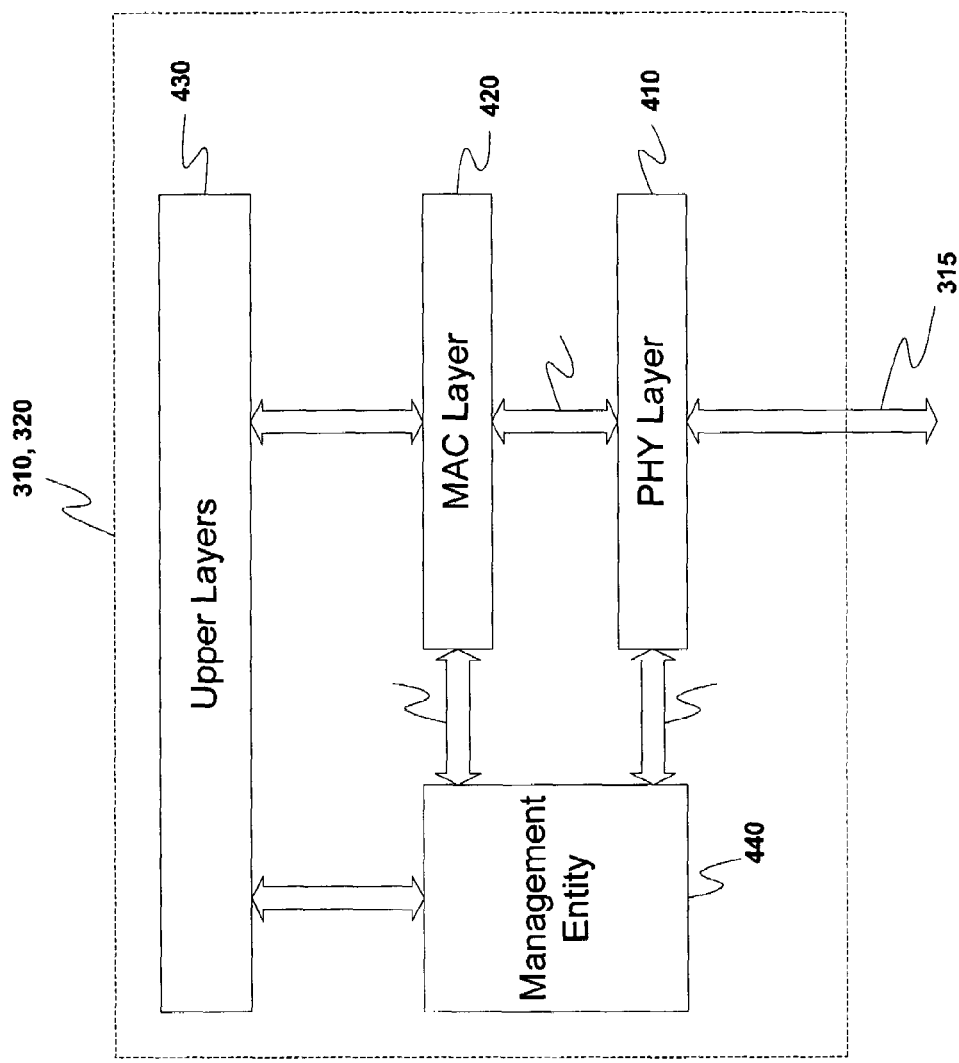
FIG. 4 is a block diagram of a device from the network of FIG. 3.

Preferred embodiments of the present invention will now be described with reference to the drawings. Throughout the several views, like reference numerals designate identical or corresponding parts.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
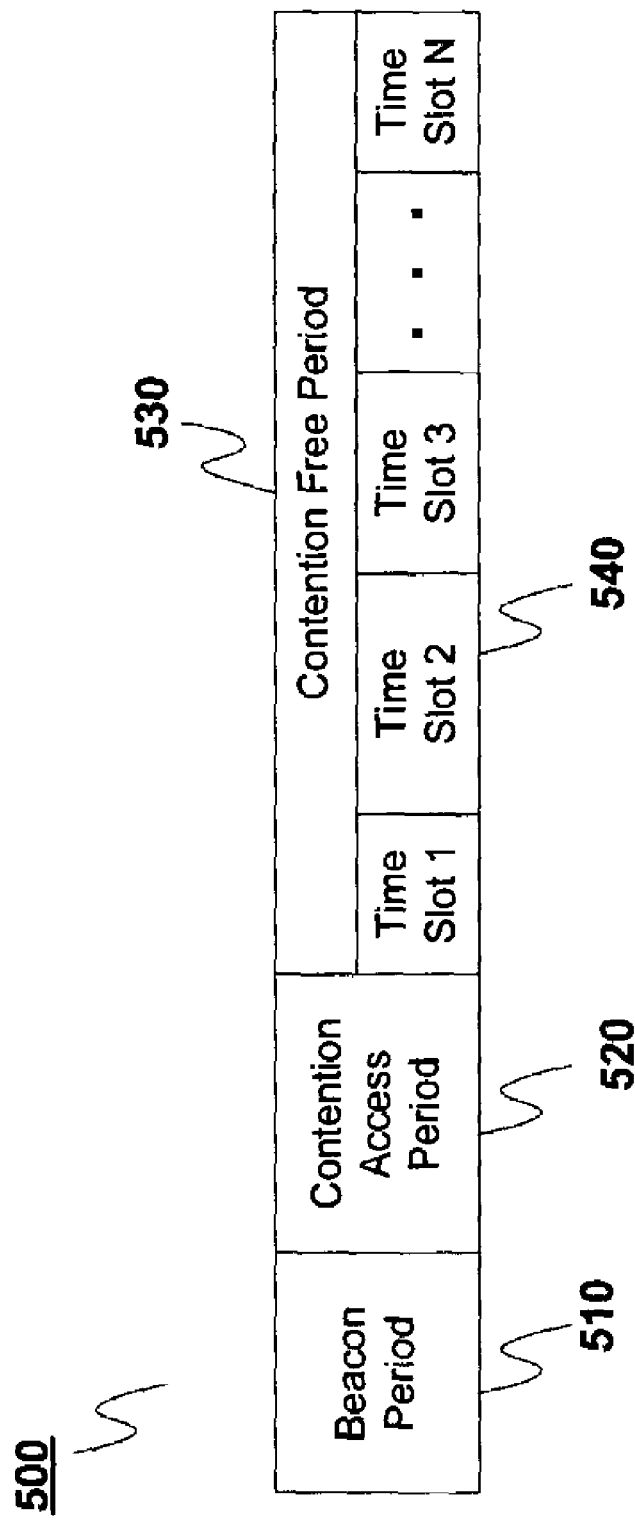
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, and MTS.

Figure 6:
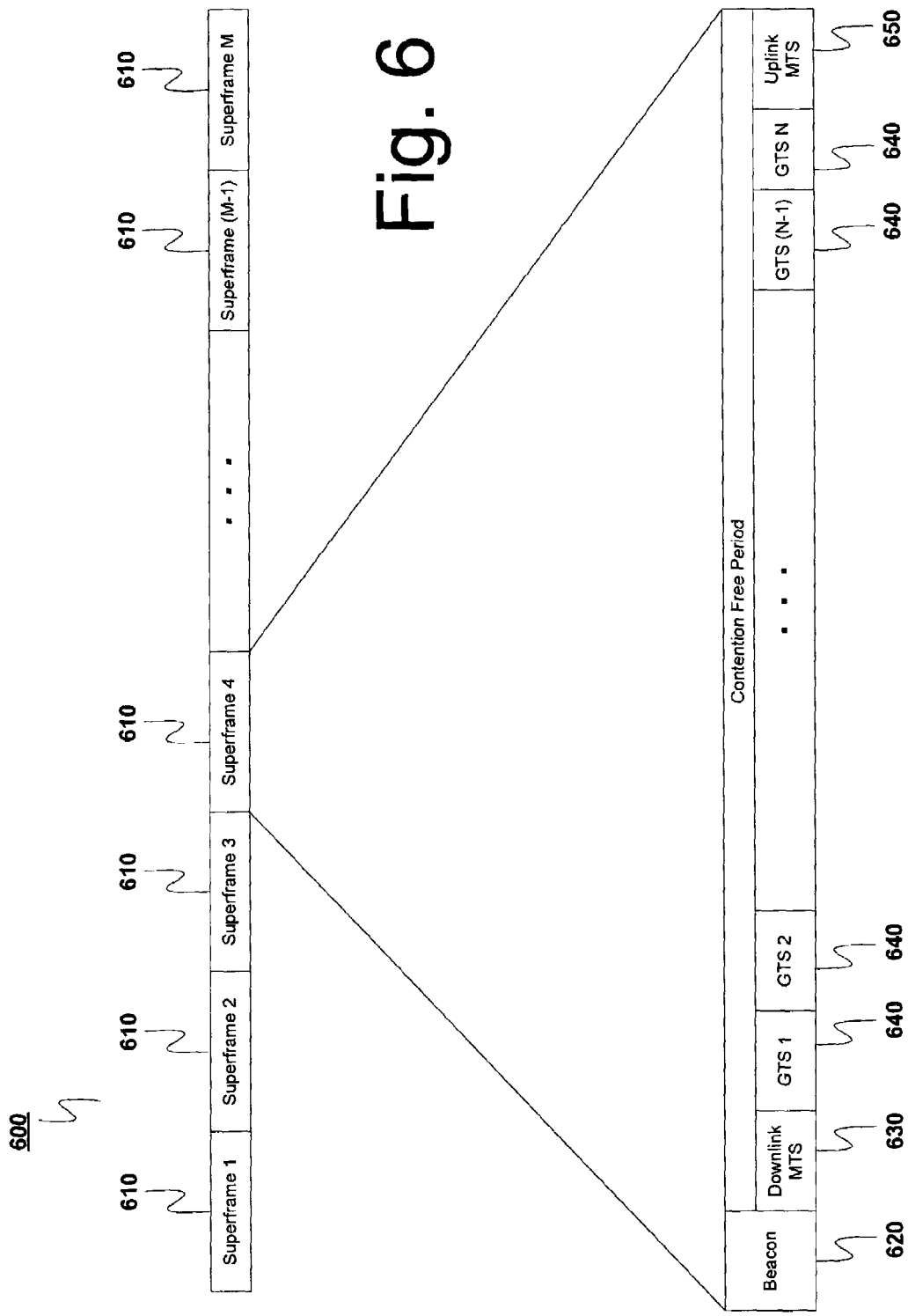
FIG. 6 is a block diagram of a specific superframe design according to a preferred embodiment of the present invention.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 650. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 650 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 650 must be chosen to handle the largest possible management frame, an immediate acknowledgement (ACK) frame, and the receiver-transmitter turnaround time. The GTS 640, the length and number must be chosen to accommodate the specific requirements of frames to be transmitted, e.g., short MPEG frames, large frames of the maximum allowable length, and the ACK policy used.

Although the disclosed embodiment uses one uplink MTS 630 placed before a plurality of GTS 640, and one downlink MTS 650 placed after a plurality of GTS 640, the number, distribution, and placement of MTS 630, 650 and GTS 640 may be varied in alternate embodiments.

However, such a TDMA protocol in general has no support for asynchronous data. A system is forced to use a static stream connection for the passing of asynchronous data, which leads to a large signal overhead, or to provide an asynchronous period (e.g., a CAP 520) that uses a contention access protocol like carrier sense multiple access/collision avoidance (CSMA/CA), which leads to performance degradation and to power usage increase The power consumption is increased because every device 310, 320 must remain powered up during the CAP 520 (i.e., none of the devices 310, 320 can enter a power-saving sleep mode). The performance is degraded because there is less certainty of a given data frame being transmitted at any given time.

Channel Time Allocations

Each device 310, 320 that desires to send data will be assigned one or more time slots 540 to pass that information. This time slot assignment can be referred to as a channel time allocation (CTA), since it represents the amount of time in the available wireless channel that the device 310, 320 is provided.

This CTA may require a device 310, 320 to be assigned a time slot 540 in each superframe 500, 610, or it may only require that the device 310, 320 be assigned a time slot 540 at some fixed or valuable periodic rate.

Interference with Superframes

Unfortunately, the wireless network 300 may not be the only thing transmitting over the local wireless channel. Other instruments might also transmit signals, e.g., other data signals, radar signals, noise signals, etc. In one situation, an adjacent network could broadcast over the same frequencies as a local wireless network 300. In another situation, a radar array might provide a periodic burst of interference that overwhelms the ability of the network 300 to transmit or receive. Any number of interfering signals could exist. In fact, a network 300 could be exposed to multiple interference sources. In such a case, however, all interference signals could be lumped together into one conceptual interference signal having multiple parts.

Interfering signals can disrupt the successful transmission of data across the network 300 by causing a receiver to be unable to properly receive a transmitted signal, e.g., if the power of the interfering signal is too great that a receiving device 310, 320 cannot decipher an intended signal that collides with the interfering signal.

Quite often interfering signals will be periodic in nature. In other words, they will repeat at a given interval. For example, if the interfering signal is a radar system, it might have a sweep time over which it repeats the same transmission. Even if the interfering signal is made up of multiple individual signals, it may still have a period during which it repeats, if each individual component of the interfering signal is periodic.

Figure 7:
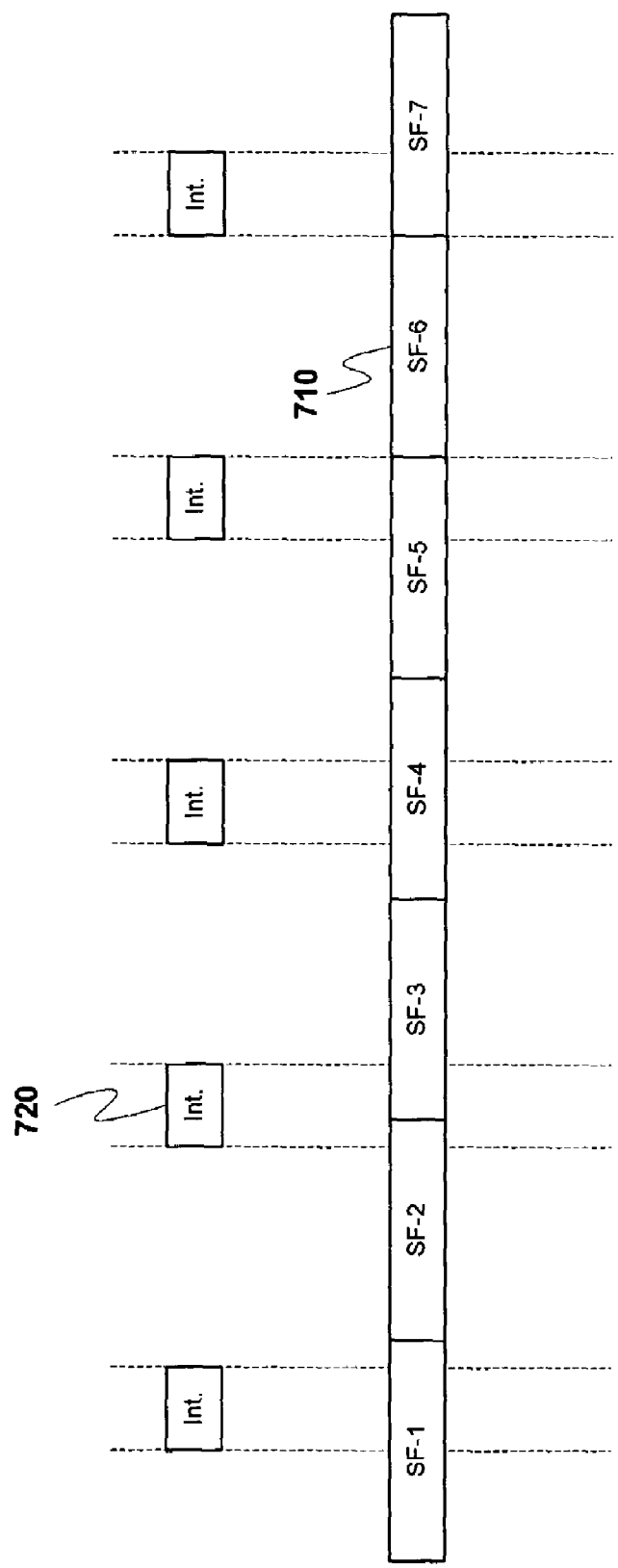
FIG. 7 is a diagram showing a series of periodic interfering signals and a series of superframes being transmitted over the same wireless channel, according to a preferred embodiment of the present invention.

FIG. 7 shows one example of a signal interfering with signals from a wireless network 300. As shown in FIG. 7, a network 300 is transmitting a series of superframes 710 having a set superframe length. At the same time, a periodic interference signal 720 is being transmitted by an external source (e.g. a radar transmitter) over the same wireless channel.

In FIG. 7, both the superframes 710 and the interfering signals 720 are periodic, although their periods are not related. As a result, the interfering signals 720 will interfere with a different part of each of the series of superframes 710. One interfering signal 720 collides with the beginning of a superframe 720; another interfering signal 720 collides with the end of a superframe 720; yet another collides with the middle of a superframe 710; and still another straddles two superframes 720, colliding with the end of one and the beginning of the other. In a worst case, the pattern of interference will only repeat at a period equal to the product of the periods of the superframes 710 and the interfering signals 720. As a result, it may be extremely difficult to predict which portions of any given superframe 710 will collide with the interfering signals 720 and be unreadable. This can be seen in FIG. 7 where the initial series of superframes 710 will suffer interference from the periodic interfering signals 720 at different points in each superframe 710.

In a preferred embodiment, the network 300 should use some kind of a scan mode to determine the existence of interfering signals 720, as well as their period and position relative to the superframes 710. This could be a scan mode performed by the network coordinator 310, a scan mode performed by a non-coordinator device 320, or any other sort of scan that the network has implemented.

In addition, as noted above, although in FIG. 7 the interfering signals 720 are shown as one signal that repeats at a given interval, in other instances it could be more complicated than that. For example, the periodic interfering signals 720 could be a collection of signals, separate from each other, but that repeat over a set period. What is important is that over a set period, the pattern of the interfering signals repeats itself predictably.

Alteration of Superframe Size and Position

Figure 8A:
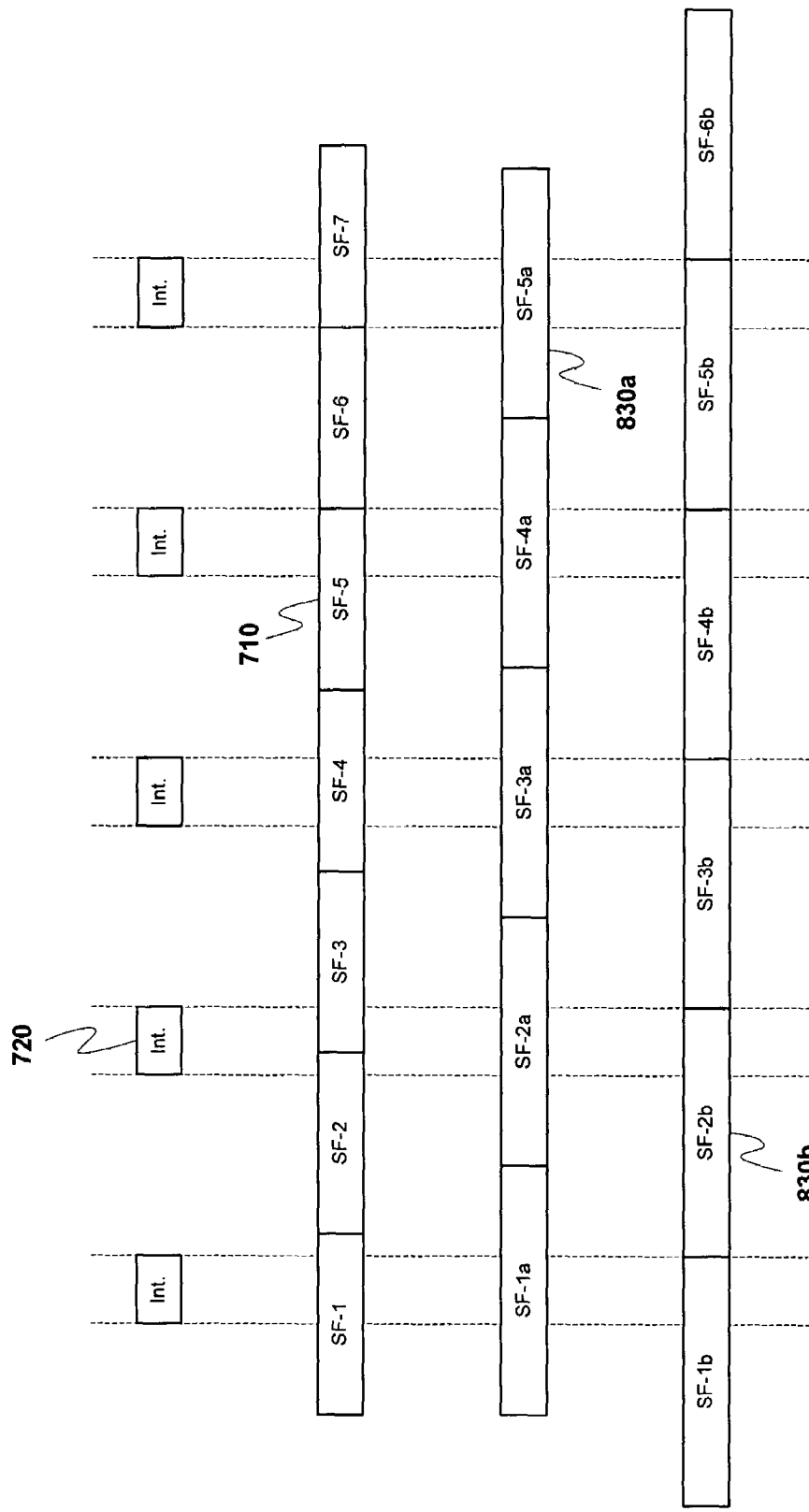
FIG. 8A is a diagram showing a superframe having the same period as an interfering signal according to a preferred embodiment of the present invention.
Figure 8B:
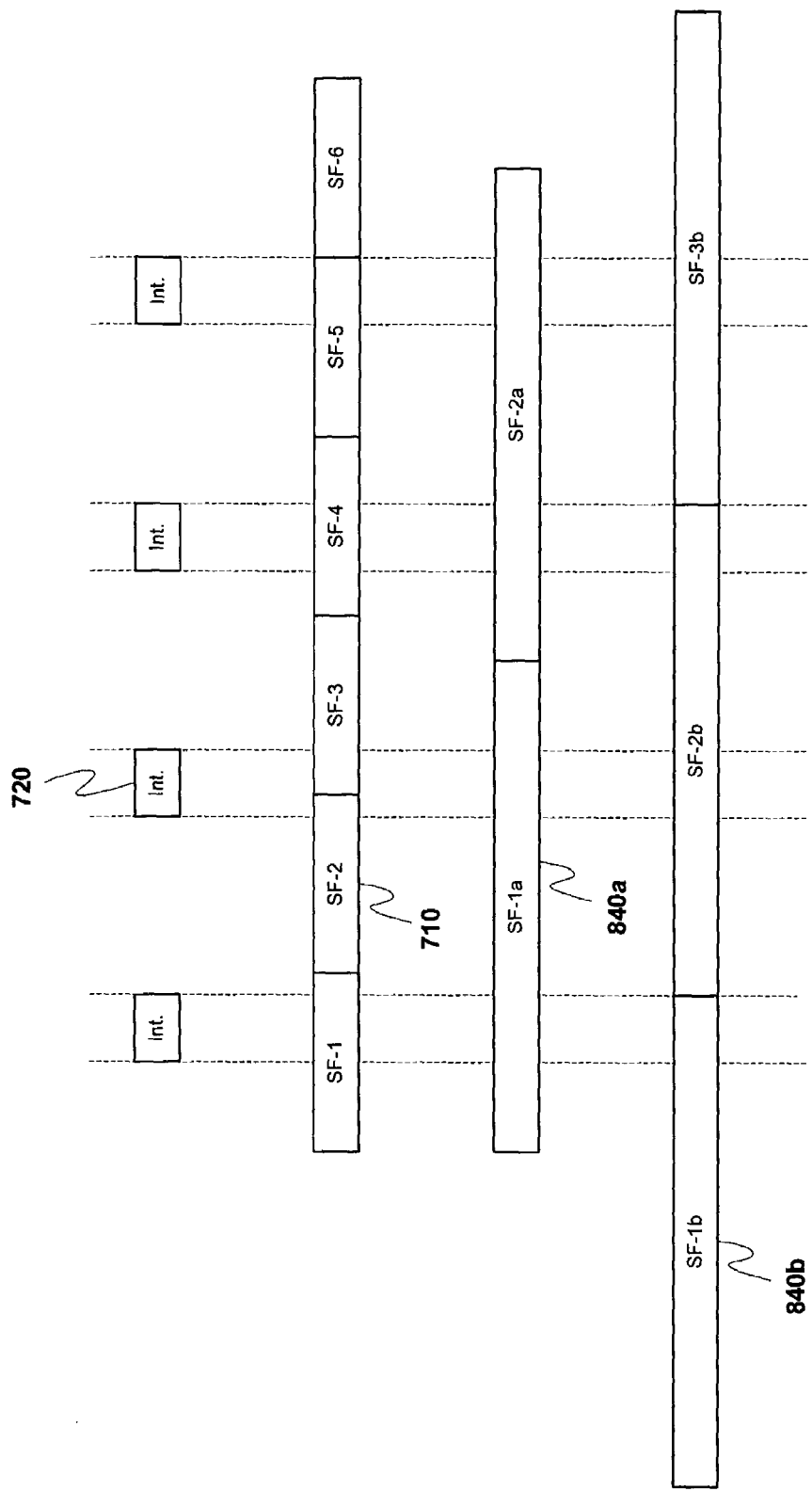
FIG. 8B is a diagram showing a superframe having twice the period of an interfering signal according to a preferred embodiment of the present invention.
Figure 8C:
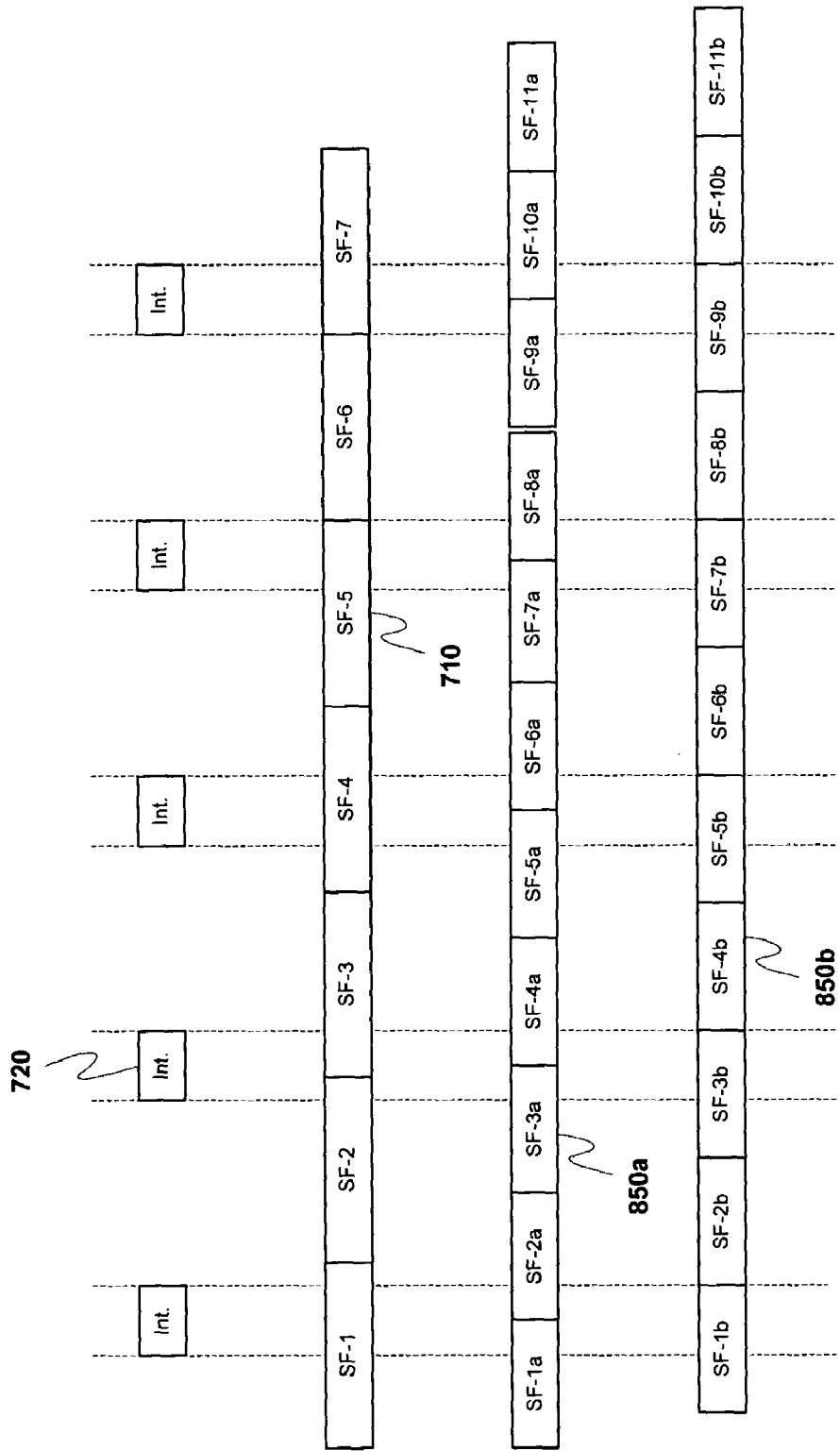
FIG. 8C is a diagram showing a superframe having half the period of an interfering signal according to a preferred embodiment of the present invention.

One way to accommodate an interfering signal 720 is to alter the size of the superframes 710 such that either (1) the period of the superframes 710 is the same as the period of the interfering signals 720, (2) the period of the superframes 710 is an integer multiple of the period of the interfering signals 720, or (3) the period of the interfering signals 720 is an integer multiple of the period of the superframes 710. Examples of these three cases are shown in FIGS. 8A-8C. FIG. 8A is a diagram showing a superframe having the same period as an interfering signal; FIG. 8B is a diagram showing a superframe having twice the period of an interfering signal; and FIG. 8C is a diagram showing a superframe having half the period of an interfering signal.

As shown in FIG. 8A, the original superframes 710 are changed in size to first modified superframes 830a that have the same period as the interfering signals 720. As a result, each of the interfering signals 720 will interfere with the same portion of a corresponding first modified superframe 830a. This allows the network 300 to more easily predict when within each first modified superframe 830a an interfering signal 720 will appear. The network coordinator 310 can then make channel time allocations such that nothing is transmitted for the duration of each interfering signal 720.

One way to accomplish this channel time allocation is to designate a time slot 540 of a length and position equal to the interfering signal 720 and assign that time slot 540 to the network coordinator 310 (since the source of interference does not have a device ID). The coordinator 310 knows to avoid any transmissions during this time slot 540, and no other device can transmit because the time slot 540 is assigned to the coordinator 310. Another way to accomplish this channel time allocation is to have the coordinator 310 simply not assign any time slots 540 during the period of interference.

Regardless of how channel time allocation is performed, once the period of the original superframes 710 is brought into accord with the period of the interfering signals 720 (by forming first modified superframes 830a), CTA will be easier. Once the two periods are the same, the network coordinator 310 need not consider any information about the period of the interference signals 720. All it need know is at what point during each of the first modified superframes 830a the interfering signal 720 will occur. (Or at what points, if the interfering signal is made up of multiple parts.) Since both have the same period, the portion of each of the first modified superframes 830a that coincides with the interfering signals 720 remains the same for each first modified superframe 830a.

Of course, this also means that the same portions of each of the first modified superframes 830a will be free of interferences. As a result, devices 310, 320 in the network 300 can be given the same time slots 540 (i.e., time slots 540 with the same position and duration) within successive superframes 830a, if desired. This simplifies the CTA, since devices 310, 320 can be assigned the same CTA in successive superframes 830a.

Regardless, by knowing when in each first modified superframe 830a the interfering signal will appear, the network coordinator 310 can better allocate channel time (e.g., time slots) to accommodate the interference.

Although in FIG. 8A the interfering signal 720 is shown as being a contiguous signal, in alternate situations, the signal could be broken up into multiple parts. In this case the network coordinator 310 will have to keep track of each individual segment of the interfering signal 720. However, because the period of the superframe 710 is the same as the period of the interfering signal 720, the placement of these interfering signal segments will be the same in each superframe 830a and so the network controller 310 need only remember the interference pattern for a single superframe 830a.

In alternate embodiments, the period of the superframe 710 can be modified not to conform exactly with the period of the interfering signal 720, but rather such that one of the superframe 710 or the interfering signal 720 have a period that is an integer multiple of the other.

FIG. 8B is a diagram showing a superframe having twice the period of an interfering signal. As shown in FIG. 8B, the original superframes 710 are changed in size to first modified superframes 840a that have the twice the period of the interfering signals 720. As a result, two repetitions of the interfering signals 720 will interfere with each of the first modified superframes 840a. However, since the period of the first modified superframe 840a is twice that of the period of the interfering signal 720, the interference points caused by the two instances of interfering signals 720 will be at the same place in each of the first modified superframes 840a.

Since the interference pattern that each superframe 840a will experience will be identical, the network coordinator 310 need only remember this one interference pattern. This allows the network coordinator 310 to more easily predict where the interfering signal 720 will appear in each of the first modified superframes 840a, and so allows it to make channel time allocations such that nothing is transmitted for the duration of each interfering signal 720. This can be done in a manner analogous to the methods described above with reference to FIG. 8A.

More generally, the period of the first modified superframe 840a can be n times the period of the interfering signal 720, where n is an integer greater than 0. Although n is equal to 2 for the embodiment shown in FIG. 8B, n could vary in alternate embodiments. In this more general case, n repetitions of the interfering signal will occur in each superframe. However, because the period of the first modified superframe 840a is an integer times the period of the interfering signal 720, the these interference points will be at the same place in each of the first modified superframes 840a.

Although in FIG. 8B the interfering signal 720 is shown as being a contiguous signal, in alternate situations, the signal could be broken up into multiple parts. In this case the network coordinator 310 will have to keep track of each individual segment of the interfering signal 720. However, because the period of the superframe 710 is an integer times the period of the interfering signal 720, the placement of these interfering signal segments will be the same in each superframe 840a, and so the network controller 310 need only remember the interference pattern of n repeated interfering signals 720 as they appear in a single superframe 840a.

FIG. 8C is a diagram showing a superframe having half the period of an interfering signal. As shown in FIG. 8C, the original superframes 710 are changed in size to first modified superframes 850a that have half the period of the interfering signals 720. As a result, an interfering signal 720 will only interfere with every other one of the first modified superframes 850a. And, since the period of the first modified superframe 850a is half that of the period of the interfering signal 720, these interference points will appear at the same place in each pair of the first modified superframes 840a.

Since the interference pattern that each interfered superframe 850a (or superframe pair, since one repetition of the interfering signal 720 takes place over two superframes 850a) will experience will be identical, the network coordinator 310 need only remember one interference pattern for each pair of superframes 850a. This allows the network coordinator 310 to more easily predict where the interfering signal 720 will appear in each of the first modified superframes 850a, and so allows it to make channel time allocations such that nothing is transmitted for the duration of each interfering signal 720.

More generally, the period of the first modified superframe 850a can be 1/n times the period of the interfering signal 720, where n is an integer greater than 0. Although n equals 2 for the embodiment shown in FIG. 8B, n could vary in alternate embodiments. In this case, the network coordinator 310 would have to remember the pattern of interference for n superframes, not just two.

Although in FIG. 8C the interfering signal 720 is shown as being a contiguous signal, in alternate situations, the signal could be broken up into multiple parts. In this case the network coordinator 310 will have to keep track of each individual segment of the interfering signal 720. However, because the period of the interfering signal 720 is an integer times the period of the superframe 710, the placement of these interfering signal segments will be the same in each repetition of n superframes 850a and so the network controller 310 need only remember the interference pattern for n repeated superframes 850a.

In the embodiments shown in FIGS. 8A and 8B, the interfering signals 720 (or segments of interfering signals 720) could appear at any point in the superframes 830a, 840a: appearing in the front of a superframe 830a, 840a, in the back of a superframe 830a, 840a, in the middle of a superframe 830a, 840a, or even straddling across two superframes 830a, 840a. In this latter case where an interfering signal 720 (or individual segments of an interfering signal 720) straddle two superframes, the one superframe 830a, 840a will have a portion of an interfering signal 720 at the beginning of the superframe 830a, 840a, and a corresponding portion of the interfering signal 720 at the end of the superframe 830a, 840a. Nevertheless, the total amount and position of channel time interfered with will remain constant for each superframe 830a, 840a, and so the interference pattern can be predicted and the channel time can more easily be allocated.

In the embodiment shown in FIG. 8C, the interfering signals 720 (or segments of interfering signals 720) could cover two or more superframes 850a. In fact, it is possible that the interference pattern of the interfering signals 720 could cause interference in all n superframes 850a. In this case two or more superframes 850a out of every n superframe will have interference. However, each will have less channel time interfered with, and the pattern of interference among n sequential superframes 850a will be predictable. Thus, the interference pattern can be predicted and the channel time within these n superframes 850a can still be easily allocated.

However, although the straddling of superframes 830a, 840a, 850a can be predicted and accommodated regardless of where it appears, it is preferable to expert some control over where the interference signals 720 will collide with the superframes 830a, 840a, 850a. And since the interference signals 720 cannot be changed, this involves altering the first modified superframes once more 830a, 840a, 850a.

Realigning Superframe Position

A preferred way to accomplish this is to realign the superframe position once the superframe period is altered. After the period of the superframes 710 is matched with that of the interfering signals 720 to form a first modified superframes 830a, 840a, 850a (either directly or with one being an integer multiple of the other), it is also desirable to realign the position of the first modified superframes 830a, 840a, 850a. By realigning the first modified superframes 830a, 840a, 850a, the relative location of the interfering signals 720 to the superframes 830a, 840a, 850a is altered, which allows the superframes 830a, 840a, 850a to be placed such that their non-interfered portions are in the most convenient position for system operation.

As shown in FIGS. 8A and 8C, according to preferred embodiments of the present invention, the first modified superframes 830a, 850a are aligned to form second modified superframes 830b, 850b in which the interfering signals 720 are coincident with the ending portion of each second modified superframe 830b, 850b in which they appear.

As shown in FIG. 8B, according to a preferred embodiment of the present invention, the first modified superframes 840a are aligned to form second modified superframes 840b in which the a series of interfering signals 720 are arranged such that the last interfering signal 720 in the series is coincident with the ending portion of each second modified superframe 840b.

This particular positioning serves several purposes. First, by keeping the interfering signals 720 from the beginning of the second modified superframes 830b, 840b, 850b, the network 300 eliminates the possibility that the interfering signal 720 will block a beacon (which appears at the beginning of a superframe).

Second, by arranging the second modified superframes 830b, 840b, 850b such that the interfering signals 720 are placed at the end of the second modified superframe 830b, 840b, 850b, the network 300 provides the largest possible uninterrupted channel time in each second modified superframe 830b, 840b, 850b.

As shown in FIGS. 8A-8C, if the interfering signals 710 were not at the end portion of the superframe (i.e., as they are in first modified superframes 830a, 840a, 850a of FIGS. 8A-8C), they would serve to split up the available channel time in a given superframe into two or more smaller channel time portions. These smaller channel time portions could limit the maximum allowable channel time allocation for any given device, which would thereby limit the network to using smaller channel time allocations.

Third, by positioning the second modified superframes 830b, 840b, 850b such that the interfering signals 720 occur at the end of each second modified superframe 830b, 840b, 850b, the network 300 can eliminate the possibility that an interfering signal 720 will straddle two superframes, thus simplifying the channel time allocation and further eliminating the possibility of interference during beacon transmittal.

Although in the preferred embodiments disclosed in FIGS. 8A-8C, the second modified superframes 830b, 840b, 850b are aligned such that the interfering signal appears at the end of the superframe 830b, 840b, 850b, alternate embodiments could position the superframes 830b, 840b, 850b anywhere desirable. For example, it might be desirable to arrange the superframes such that the interfering signal 720 was placed a certain length of time before the end of the superframe 830b, 840b, 850b to account for minor variations in the duration of the interfering signals 720. Other variations are also possible.

In addition, in some embodiments the interfering signal 720 may actually be made up of multiple individual segments spread out across the superframe duration. In this case, the alignment of the second modified superframes 830b, 840b, 850b may be more complicated. The network controller 310 will preferably align the second modified superframes 830b, 840b, 850b such that no beacon is interfered with by a segment of the interfering signal 720, and to allow the largest possible contiguous channel times for allocation. As noted above, however, other alignment criteria could be used.

It should be noted that in some instances it is possible that the starting superframe period for a network 300 will happen to be to be an integer multiple or an integer fraction of the interfering signal 720. In this case, no alteration of the superframe period will be necessary. In addition, it is also possible that the superframe position will be such that when the period is appropriate, the interfering signals 720 are positioned at a desirable location. In this case, no alteration of the superframe position will be necessary.

Effecting Change in Superframe Period and Position

As noted above, it is desirable to alter the period and position of the periodic superframes 500, 710 to better accommodate the presence of an interfering signal 720. To accomplish this, the network controller 310 preferably sends new superframe timing information through instructions in the beacons 510 of the superframes 500, 710. In alternate situations, of course, other information can be sent from the coordinator 310 to all of the non-coordinator devices 320, e.g., information regarding switching channels, handing over to new coordinator 310, shutting down the network 300, etc. Although the disclosed embodiments relate to the passing of superframe timing information, the methods disclosed are equally applicable to any transfer of important information between the coordinator 310 and non-coordinator devices 320.

One difficulty in transferring information from the coordinator 310 to the non-coordinator devices 320 is that not every non-coordinator device 320 listens to every superframe 500, 710. In some implementations individual devices 320 will go into a power-saving sleep mode during any time that they either are not instructed to listen, or have no need to listen for an extended period of time. Devices 320 that are asleep in a network 300 will not hear every beacon 510, and so would not be able to find out when the network coordinator 310 is changing the period or position of the superframes 500, 710, if such information were included in a single beacon 510.

It is therefore desirable to provide a way to send relevant beacon information in a manner that ensures that all devices 320 will receive it, but which also allows non-coordinator devices 320 to enter a sleep mode. A preferred method of accomplishing this is to provide certain "system wake" beacons that all devices must listen to, regardless of whether they are in a sleep mode or not.

These system wake beacons can be defined in any of a variety of ways. In one embodiment they could simply be a periodic beacon 510, i.e., every $m^{th}$ beacon 510 (where m is an integer greater than 0). Each device would be required to listen to each $m^{th}$ beacon, 510 regardless of whether it was in a sleep mode or not.

In other embodiments it could be a specific beacon that is counted down to in each beacon. So long as the countdown time is no shorter than the longest allowed sleep time (i.e., the longest time a device 320 is allowed to stay in a sleep mode before it listens to a beacon 510), every non-coordinator device 320 is guaranteed to learn about the system wake beacon before the countdown is complete. Individual devices 320 would have to listen periodically to a beacon 510, but all the devices 320 need not be coordinated to the same beacon 510. Once a device learns that a system wake beacon is coming, it will know from the countdown which other beacon 510 it must listen for.

In yet other embodiments, the beacons 510 could be identified by an absolute numbering system, and the system wake beacons could be dynamically set. In this case, each system wake bacon would include information regarding the beacon number of the next system wake beacon. Intermediate beacons could also include this information to account for the chance that a device 320 will accidentally miss a system wake beacon. All of the devices 320 would have to listen during each system wake beacon, and they will be able to tell from the present system wake beacon when the next system wake beacon will be.

The relevant information relating to system changes (e.g., alteration of superframe period or position) is preferably contained in the system wake beacon. And as noted above, there are numerous methods to insure that every non-coordinator device 320 will listen to every system wake beacon.

Absent some method to make certain that each non-coordinator device 320 listens to every system wake beacon, a sleeping device 320 might wake up into a situation where its coordinator 310 has changed, its superframe structure has been altered, etc. In such a case the device 320 will not be able to find its coordinator 310, and will thus be unable to continue its participation in the network 300.

In some embodiments, the network coordinator 310 can provide an indicator that a system change is in progress, which can warn the non-coordinator devices 320 in the network 300 that they need to stay awake and listen for that information in the current beacon 510. For example, a system change bit can be included at the beginning of the beacon 510. If the system change bit is set, then a change is being made to system parameters and sleeping devices should listen to the entire beacon 510. If the system change bit is not set, then no change will be made to system parameters, and a sleeping device may return to a sleep mode without interpreting the rest of the beacon 510.

In some of these embodiments all participating devices 320 will echo the system change bit in their own frames. Thus, if a device 320 missed a beacon 510 including the system change information, but does successfully receive another frame with the system change bit set, the device 320 knows to stay awake and listen to the next beacon 510.

This method saves power by allowing devices to remain sleeping as long and as often as possible. It also enables synchronized change throughout the network by arranging a set time that changes will occur. This is essential in some circumstances, such as when it is necessary to switch channels.

CONCLUSION

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Thus, one preferred embodiment of the present invention is used in an ultrawide bandwidth network. However, it is applicable to other sorts of networks as well.

Obviously, numerous modifications and variations of the present invention are possible in light of the above teachings. It is therefore to be understood that within the scope of the appended claims, the invention may be practiced otherwise than as specifically described herein.

I claim:

1. A method of accommodating regularly intermittent interfering signals in a wireless network, comprising:
   scanning in a transmission medium at a coordinator device for the regularly intermittent interfering signals;
   measuring a current repetition period of the regularly intermittent interfering signals; and
   altering a superframe period in the wireless network such that the superframe period is equal to the current repetition period of the regularly intermittent interfering signals,
   wherein the regularly intermittent interfering signals are present in the transmission medium during a series of first regularly-repeating time durations, and are absent from the transmission medium during a series of second regularly-repeating time durations, and
   wherein the repetition period indicates how frequently the first regularly-repeating time durations occur.

2. The method of accommodating regularly intermittent interfering signals in a wireless network, as recited in claim 1, further comprising altering a superframe position relative to an interfering signal position.

3. The method of accommodating regularly intermittent interfering signals in a wireless network, as recited in claim 2, wherein the step of altering the superframe position relative to the interfering signal position is performed such that no portion of the regularly intermittent interfering signals interfere with any superframe beacon.

4. The method of accommodating regularly intermittent interfering signals in a wireless network, as recited in claim 2, wherein the step of altering the superframe position relative to the interfering signal position is performed such that a maximum amount of contiguous channel time that is not interfered with by the regularly intermittent interfering signals is provided in each superframe.

5. The method of accommodating regularly intermittent interfering signals in a wireless network, as recited in claim 1, wherein the regularly intermittent interfering signals are radar signals.

6. The method of accommodating regularly intermittent interfering signals in a wireless network, as recited in claim 1, further comprising assigning to a network coordinator all channel time in each superframe that is interfered with by the regularly intermittent interfering signals.

7. The method of accommodating regularly intermittent interfering signals in a wireless network, as recited in claim 1, wherein the wireless network is an ultrawide bandwidth network.

8. A method of accommodating regularly intermittent interfering signals in a wireless network, comprising:
   scanning in a transmission medium at a coordinator device for the regularly intermittent interfering signals;
   measuring a current repetition period of the regularly intermittent interfering signals; and
   altering a superframe period in the wireless network such that the superframe period is equal to n times the current repetition period of the regularly intermittent interfering signals, where n is an integer greater than 1,
   wherein the regularly intermittent interfering signals are present in the transmission medium during a series of first regularly-repeating time durations, and are absent from the transmission medium during a series of second regularly-repeating time durations, and
   wherein the repetition period indicates how frequently the first regularly-repeating time durations occur.

9. The method of accommodating regularly intermittent interfering signals in a wireless network, as recited in claim 8, further comprising: altering a superframe position relative to an interfering signal position.

10. The method of accommodating regularly intermittent interfering signals in a wireless network, as recited in claim 9, wherein the step of altering the superframe position relative to the interfering signal position is performed such that no portion of the regularly intermittent interfering signals interfere with any superframe beacon.

11. The method of accommodating regularly intermittent interfering signals in a wireless network, as recited in claim 9, wherein the step of altering the superframe position relative to the interfering signal position is performed such that a maximum amount of contiguous channel time that is not interfered with by the regularly intermittent interfering signals is provided in each superframe.

12. The method of accommodating regularly intermittent interfering signals in a wireless network, as recited in claim 8, wherein the regularly intermittent interfering signals are radar signals.

13. The method of accommodating regularly intermittent interfering signals in a wireless network, as recited in claim 8, further comprising assigning to a network coordinator all channel time in each superframe that is interfered with by the regularly intermittent interfering signals.

14. The method of accommodating regularly intermittent interfering signals in a wireless network, as recited in claim 8, wherein the wireless network is an ultrawide bandwidth network.

15. A method of accommodating regularly intermittent interfering signals in a wireless network, comprising:
   scanning in a transmission medium for the regularly intermittent interfering signals;
   measuring a current repetition period of the regularly intermittent interfering signals; and
   altering a superframe period in the wireless network such that the superframe period is equal to 1/n times the current repetition period of the regularly intermittent interfering signals, where n is an integer greater than 1,
   wherein the regularly intermittent interfering signals are present in the transmission medium during a series of first regularly-repeating time durations, and are absent from the transmission medium during a series of second regularly-repeating time durations, and wherein the repetition period indicates how frequently the first regularly-repeating time durations occur.

16. The method of accommodating regularly intermittent interfering signals in a wireless network, as recited in claim 15, further comprising: altering a superframe position relative to an interfering signal position.

17. The method of accommodating regularly intermittent interfering signals in a wireless network, as recited in claim 16, wherein the step of altering the superframe position relative to an interfering signal position is performed such that no portion of the regularly intermittent interfering signals interfere with any superframe beacon.

18. The method of accommodating regularly intermittent interfering signals in a wireless network, as recited in claim 16, wherein the step of altering the superframe position relative to the interfering signal position is performed such that a maximum amount of contiguous channel time that is not interfered with by the regularly intermittent interfering signals is provided in each superframe.

19. The method of accommodating regularly intermittent interfering signals in a wireless network, as recited in claim 15, wherein the regularly intermittent interfering signals are radar signals.

20. The method of accommodating regularly intermittent interfering signals in a wireless network, as recited in claim 15, further comprising assigning to a network coordinator all channel time in each superframe that is interfered with by the regularly intermittent interfering signals.

21. The method of accommodating regularly intermittent interfering signals in a wireless network, as recited in claim 15, wherein the wireless network is an ultrawide bandwidth network.

* * * * *